Inventor
L. J. White
By A. D. Adams
Attorney

Patented July 21, 1942

2,290,838

UNITED STATES PATENT OFFICE 2,290,838

TEMPERATURE AND PRESSURE RESPONSIVE EXCESS FLOW VALVE FOR LIQUEFIED GAS SYSTEMS

Loyd J. White, San Antonio, Tex., assignor to Southern Steel Company, San Antonio, Tex., a corporation of Texas Application June 7, 1940, Serial No. 339,388

5 Claims. (Cl. 236—93)

This invention relates to excess flow valves of the type generally used in liquefied petroleum gas systems wherein a tank carries liquefied gas under pressure and gas dispensing means for delivering the gas in the vapor phase conveys the gas to a point of use. The main object is to provide an improved type of valve which operates in response to changes in both the pressure and the temperature. In such systems, the vapor pressure in the closed tank and the dispensing conduit leading therefrom is always dependent upon the temperature. It is therefore highly desirable to reduce the valve opening when the temperature and the resulting pressure increase and to increase the valve opening when the temperature and pressure decrease. The temperature range in a system of this kind, if the tank is above ground may be over 100°, depending upon the climatic conditions. Another important aim is to provide a simplified design of valve for accomplishing the above purpose which can be manufactured and installed in existing systems or in new systems without excessive cost.

Other aims and advantages of the invention will appear in the specification, when considered in connection with the accompanying drawing, wherein.

Figure 1:
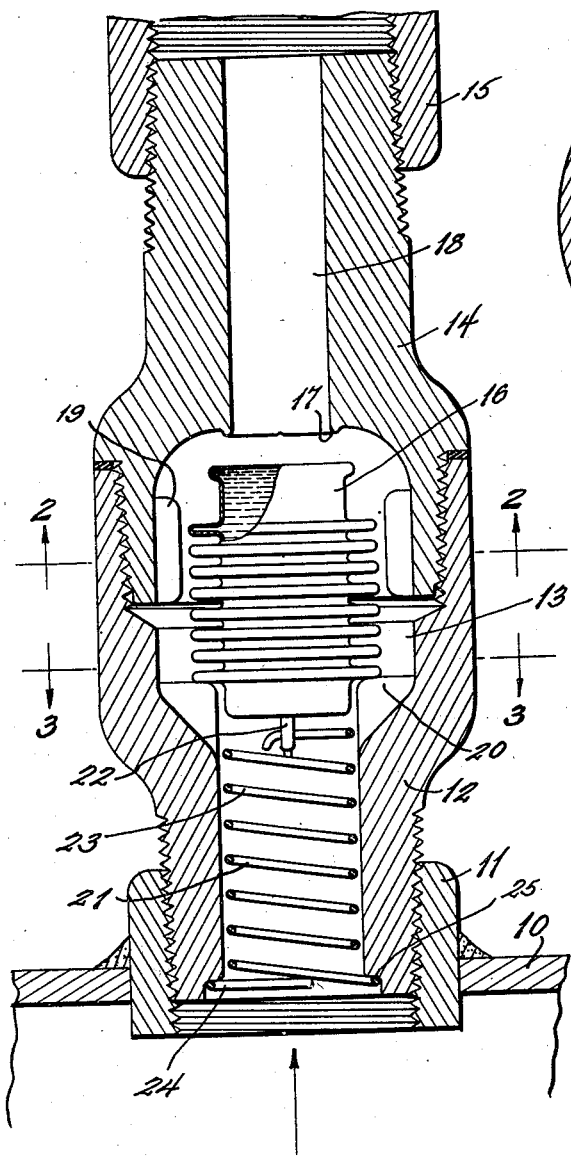
Fig. 1 is a vertical sectional view showing the preferred form of valve applied to the dispensing conduit leading from a storage tank.
Figure 2:
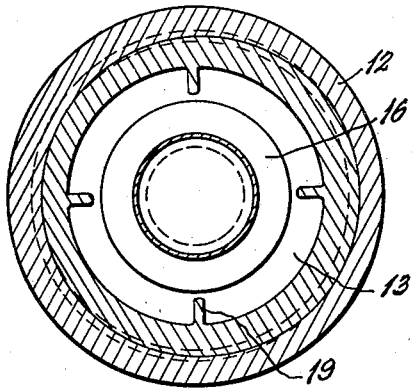
Fig. 2 is a sectional view taken on the line 2—2 of Fig. 1.
Figure 3:
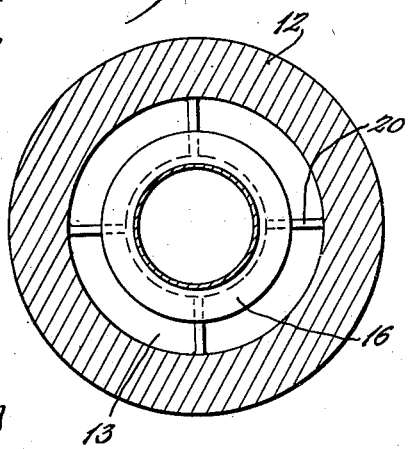
Fig. 3 is a sectional view taken on the line 3—3 of Fig. 1.

Referring particularly to the drawing, the embodiment of the valve, there shown, is applied to the vapor conduit leading from an ordinary storage tank 10 such as is used in butane systems. It will be understood, however, that this valve may be placed anywhere in the outlet conduit between the tank and the usual pressure reducing regulator. In systems of the type shown in Reissue Patent No. 21,470, it may be placed in the discharge pipe approximately in the manner shown herein; but in systems of the types shown in Patents 2,121,675 and 2,176,829, for example, it may be connected directly to the outlet nipple leading from the combination valve fitting to the regulator. The particular location therefore is of no great importance.

In this instance, the tank is shown as having an ordinary welded-on screw threaded collar 11 to which is connected the lower section 12 of a two-part casing or housing for the valve. In this example, the lower section 12 is internally screw threaded at its upper end and is enlarged to provide a chamber 13 and an upper section 14 is externally screw threaded and connected to the lower section as shown, being likewise enlarged to provide a continuation of the chamber 13. The upper end of the section 14 is adapted to be connected to an ordinary pipe or fitting 15 leading to the usual dispensing appurtenances.

Within the chamber 13 is shown a valve embodying a closed sheet metal diaphragm chamber or bellows 16 filled with liquid or gas under standard temperature and pressure conditions. In a butane system, for example, it may be filled with liquid butane which will expand and contract sufficiently in response to temperature changes to control the flow of gas. The upper end of the bellows chamber is shown as being flat and constituting a valve which cooperates with a seat 17 at the lower end of the conduit 18 in the upper section of the valve housing or casing. It is bodily movable and is guided vertically by circumferentially spaced, radial, inwardly extending vanes 19 preferably integral with the inside wall of the upper section 14. The lower end of the bellows is shown as being reduced and the lowermost corrugation rests upon circumferentially spaced radial ledges or shoulders 20 conveniently formed integral with the lower sections 12 of the casing, leaving ample space for the gas to pass through the conduit 21 in the lower section around the bellows through the chamber and the valve opening.

In some instances, the bellows may be weighted to prevent it from being closed due to normal flow of gas through the valve opening and a slight pressure differential across the opening will not raise it. However, it is of such size that it is desirable to employ a tension spring in the conduit 21 in the lower section of the casing to hold it open as shown in Fig. 1. For that purpose, the lower end wall of the bellows is shown as having a perforated ear or lug 22 to receive the upper end of a coil spring 23 and the lower end of the spring has an enlarged convolution 24 seated against a shoulder 25 in the lower end portion of the section 12 conveniently formed by a small counterbore. It will be understood however that the spring may be mounted in any suitable manner.

From the foregoing description, it will be understood that the main purpose of the valve is to prevent excess flow of gas under high pressure in case of a rupture or break in the high pressure conduit. It is also employed to control the flow of gas due to temperature changes and therefore to maintain a more or less uniform B. t. u. content. It is highly desirable to reduce the valve opening at high temperatures because the corresponding high pressures will cause a great volume of gas to flow through the valve opening due to that pressure. In the usual ball or slug type of excess flow check valve, no such provision can be made to control the flow due to temperature changes. They either close completely or remain fully open. Also, it will be apparent to those skilled in the art that valves embodying this improvement can be manufactured and installed at a minimum expense. There are no parts which require quick replacement or any adjustment. Moreover, the gas or liquid filled bellows can be easily renewed, if necessary. It provides for maximum safety in liquefied gas systems which are subjected to the most rigid safety inspection in most States.

Obviously, the present invention is not restricted to the particular embodiment thereof herein shown and described.

What is claimed is:

1. An excess flow check valve of the character described for use in a liquefied gas system or the like having a dispensing conduit; a casing forming a part of said conduit having a valve seat; a bellows having a valve portion at one end adapted to cooperate with said seat and closing in the direction of flow; stop means in the casing at the other end of said bellows; and spring means connected to said other end normally holding it in engagement with said stop means, said bellows being filled with an expansible fluid responsive to temperature changes whereby to expand the bellows and restrict the valve opening when the temperature of the gas increases, said bellows also being bodily movable away from said stop means to close the valve opening when the flow of gas is excessive.

2. As an article of manufacture, a valve for controlling the flow of a fluid under pressure subject to changes in pressure and temperature comprising, in combination, a valve casing adapted to form a part of a conduit, through which the fluid passes; and an automatic valve element in the casing closing in the direction of flow and including an expansible operating member responsive to the temperature of the fluid to restrict the valve opening when the temperature of the fluid increases, said valve element also being slidably mounted and responsive to pressure due to flow through the casing and adapted to close when the flow is excessive.

3. In combination with a conduit connected to deliver gaseous fuel under pressure from a liquefied gas system, wherein the delivered gas is subject to variations in temperature and pressure, an excess flow valve in said conduit comprising a single valve member closing in the direction of flow of the gas and embodying an expansible element exposed and responsive to the temperature of the gas passing the valve to restrict the valve opening in response to increases in temperature, said valve also being movable bodily toward closed position in response to increases in pressure due to flow of the gas through the valve and adapted to close automatically in case of excess flow beyond a predetermined maximum.

4. An excess flow valve of the character described for use in the gas delivery conduit of a liquefied gas system, wherein the gas is subject to variations in temperature and pressure, comprising a hollow casing forming a part of the gas delivery conduit; a single valve member in the form of an expansible bellows bodily movable within the casing toward closed position in the direction of flow of the gas and subjected to valve restricting movements in response to increases in pressure due to increased flow; and said bellows being filled with expansible fluid also to restrict the valve opening and thereby regulate the gas flow due to increases in temperature of the gas.

5. An excess flow valve of the character described for use in the gas delivery conduit of a liquefied gas system, wherein the gas is subject to variations in temperature and pressure, comprising a hollow casing presenting a valve chamber and forming a part of the delivery conduit; a single valve element in the form of an expansible bellows bodily movable within the casing toward closed position in the direction of flow of the gas in response to excess flow of the gas and filled with an expansible fluid to restrict the flow of the gas in response to abnormal increase in temperature of the gas; and a spring connected normally to hold the valve open to permit constant flow of gas at a predetermined temperature and pressure.

LOYD J. WHITE.